UNITED STATES PATENT OFFICE.

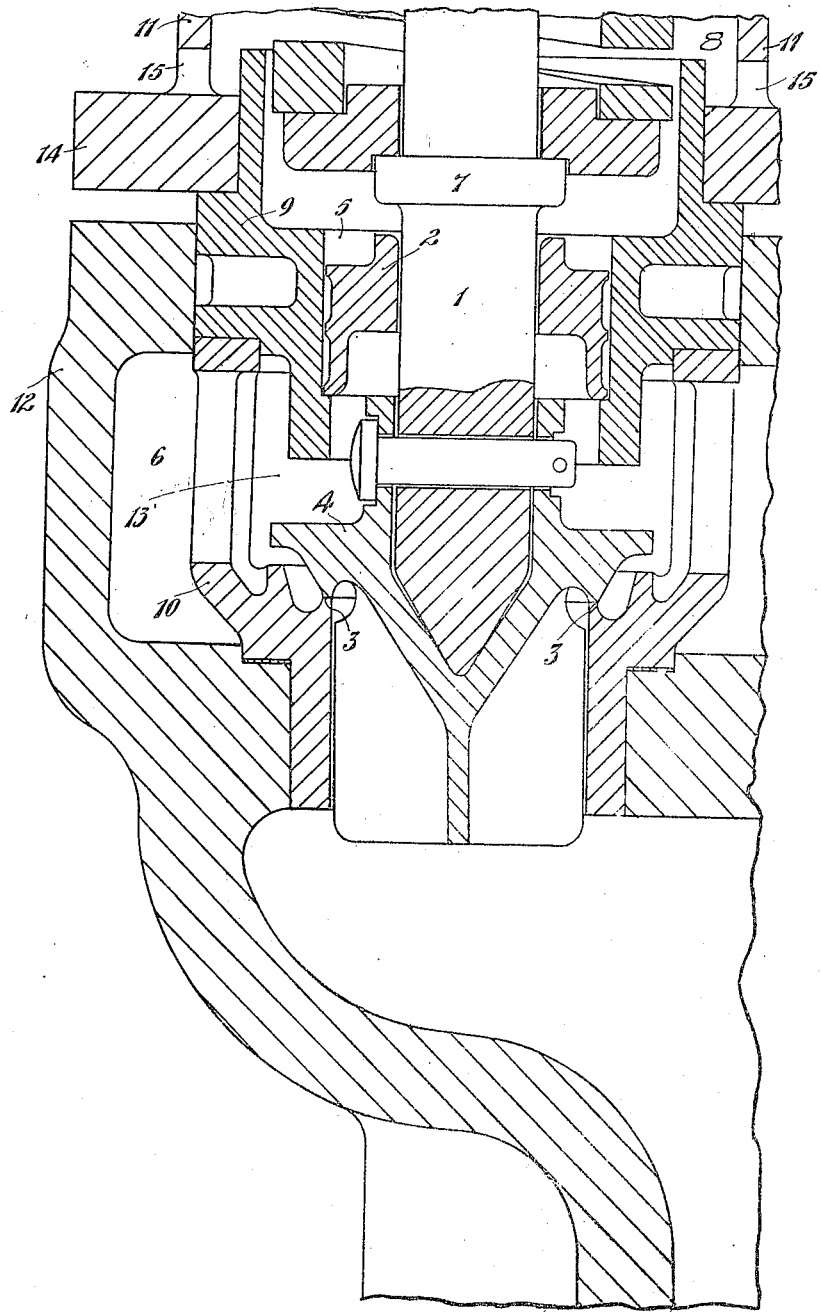

DAVID COCKBURN AND DONALD MacNICOLL, OF CARDONALD, NEAR GLASGOW, SCOTLAND.

SAFETY-VALVE.

1,262,641.   Specification of Letters Patent.   Patented Apr. 16, 1918.

Application filed July 18, 1917. Serial No. 181,297.

*To all whom it may concern:*

Be it known that we, DAVID COCKBURN and DONALD MACNICOLL, subjects of the King of the United Kingdom of Great Britain and Ireland, and both residing at Cardonald, near Glasgow, Scotland, have invented a certain new and useful Improvement in Safety-Valves, of which the following is a specification.

This invention relates to improvements in safety valves of the type fitted with a balancing member or piston above the valve whereby to obtain increased lift of the valve proper, and has for its primary object to provide a simple construction such that, in the event of the balancing member or piston binding, the valve may still function as a safety valve having a lift corresponding to its size.

To this end the invention consists in the provision of a balancing member or piston movable relatively to the valve spindle into engagement with a collar on the spindle.

The figure of the accompanying drawing is a vertical section of a safety valve embodying the invention.

As shown, there is fitted to surround the valve spindle 1 a balancing piston 2 of greater area than the cross-sectional area of the opening at the valve seat 3, there being sufficient clearance between the piston 2 and the spindle 1 to insure that the spindle 1 and the valve proper 4 may be free to move in the event of the piston 2 binding.

The piston 2 is movable in a cylindrical chamber 5 in communication with the waste fluid space 6, so that, when the valve proper 4 rises from its seat, the available pressure acting on the underside of the piston 2 will serve to lift the piston 2 independently of the spindle 1, assuming that it has not risen with the spindle 1.

On the spindle 1 above the piston 2 is a stop or collar 7 which forms an abutment for the usual spring 8.

Normally, when the valve 4 and the spindle 1 rise, the spindle 1 passes through the piston 2 which remains stationary for the time being; the piston 2 being subsequently lifted by the action of the fluid pressure thereon, and impacting the collar 7 so that an impetus is imparted to the spindle 1 in the direction to lift the valve proper 4.

It will thus be seen that the valve 4 can function as a safety valve independently of the piston 2, being only dependent on the piston 2 for increased lift.

Conveniently, the cylindrical chamber 5 may be formed in the upper part 9 of a two-part cage member of which the other part 10 is formed with the valve seat 3, such cage member being secured in position by the same bolts as secure the cover 11 of the valve casing 12, such cage member 9, 10 being provided with ports 13 whereby the cylindrical chamber 5 communicates with the waste fluid space 6.

The wall of the upper part 9 of the cage member preferably extends above the flange 14 of the cover 11 which latter is provided with an outlet or outlets 15 for water of condensation, the wall of the upper part 9 of the cage member acting as a dam, so as to prevent accumulation of water and formation of rust within the casing 12.

What we claim is:—

1. In a safety valve, in combination with a valve spindle having a stop, a valve movable with said spindle, and a balancing piston fitted to said spindle and movable relatively thereto into engaging relation with said stop.

2. In a safety valve, in combination with a valve spindle having a collar, a valve movable with said spindle, a cage member surrounding said spindle, said cage member presenting a valve seat and formed with a cylindrical chamber, and a balancing piston movable in said cylindrical chamber relatively to said spindle and adapted to engage said collar.

In testimony whereof we have signed our names to this specification in the presence of two subscribing witnesses.

DAVID COCKBURN.
DONALD MacNICOLL.

Witnesses:
HENRY MASON,
ANNE WATT.